United States Patent
Da Silva et al.

(10) Patent No.: US 12,328,160 B2
(45) Date of Patent: *Jun. 10, 2025

(54) MEASUREMENT REPORTING ENHANCEMENTS IN BEAM BASED SYSTEMS

(71) Applicant: TELEFONAKTIEBOLAGET LM ERICSSON (PUBL), Stockholm (SE)

(72) Inventors: Icaro L. J. Da Silva, Solna (SE); Pradeepa Ramachandra, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/588,017

(22) Filed: Feb. 27, 2024

(65) Prior Publication Data

US 2024/0195459 A1    Jun. 13, 2024

Related U.S. Application Data

(63) Continuation of application No. 16/497,237, filed as application No. PCT/IB2018/052001 on Mar. 23, 2018, now Pat. No. 11,929,793.

(Continued)

(51) Int. Cl.
  *H04B 7/0408*     (2017.01)
  *H04B 7/06*       (2006.01)
  (Continued)

(52) U.S. Cl.
  CPC ......... *H04B 7/0408* (2013.01); *H04B 7/0626* (2013.01); *H04B 7/0695* (2013.01); *H04B 17/309* (2015.01); *H04L 27/261* (2013.01)

(58) Field of Classification Search
  None
  See application file for complete search history.

(56) References Cited

U.S. PATENT DOCUMENTS

| | | | |
|---|---|---|---|
| 11,929,793 B2* | 3/2024 | Da Silva | H04B 7/0408 |
| 2012/0115463 A1* | 5/2012 | Weng | H04L 1/0026 455/425 |

(Continued)

FOREIGN PATENT DOCUMENTS

| | | |
|---|---|---|
| CN | 104937972 A | 9/2015 |
| CN | 105530034 A | 4/2016 |

(Continued)

OTHER PUBLICATIONS

R4-1700968 Beam and cell RRM Measurements 2017.*

(Continued)

*Primary Examiner* — Christopher T Wyllie
(74) *Attorney, Agent, or Firm* — Ericsson Inc.

(57) ABSTRACT

In accordance with particular embodiments, there is disclosed herein a method performed by a wireless device for measurement reporting. The method includes detecting a first number of beams. The method also includes measuring one or more characteristics of a second number of beams. The second number of beams comprises one or more beams of the first number of beams. The method additionally includes generating a measurement report that includes beam measurement information derived from the measurement of the one or more characteristics of the second number of beams. The method further includes transmitting the measurement report with the beam measurement information to a network node.

14 Claims, 9 Drawing Sheets

Related U.S. Application Data

(60) Provisional application No. 62/476,396, filed on Mar. 24, 2017.

(51) Int. Cl.
*H04B 17/309* (2015.01)
*H04L 27/26* (2006.01)

(56) References Cited

U.S. PATENT DOCUMENTS

| | | | |
|---|---|---|---|
| 2016/0173261 A1 | 6/2016 | Di Girolamo et al. | |
| 2016/0285660 A1 | 9/2016 | Frenne et al. | |
| 2017/0026938 A1 | 1/2017 | Onggosanusi et al. | |
| 2017/0034728 A1* | 2/2017 | Zhang | H04W 24/02 |
| 2017/0195027 A1 | 7/2017 | Baek et al. | |
| 2017/0208494 A1* | 7/2017 | Moon | H04L 5/0048 |
| 2018/0069606 A1* | 3/2018 | Jung | H04B 7/0617 |
| 2018/0248601 A1 | 8/2018 | Kishiyama et al. | |
| 2020/0021336 A1* | 1/2020 | Da Silva | H04W 36/0085 |
| 2021/0184739 A1* | 6/2021 | Sang | H04L 5/0048 |
| 2022/0077896 A1* | 3/2022 | Jung | H04B 7/024 |
| 2024/0195459 A1* | 6/2024 | Da Silva | H04B 7/0695 |

FOREIGN PATENT DOCUMENTS

| | | | | |
|---|---|---|---|---|
| CN | 106471752 A | | 3/2017 | |
| CN | 106633501 B | | 6/2018 | |
| GB | 2559424 A | * | 8/2018 | H04B 17/24 |
| WO | 2015080648 A1 | | 6/2014 | |
| WO | 2016055102 A1 | | 4/2016 | |
| WO | 2016148127 A1 | | 9/2016 | |
| WO | 2016192006 A1 | | 12/2016 | |
| WO | 2017028315 A1 | | 2/2017 | |
| WO | WO-2018084968 A1 | * | 5/2018 | H04B 7/0617 |

OTHER PUBLICATIONS

R2-1701130 Measurement and Mobility Considering Beamforming 2017.*
R1-1701130 Huawei et al. Measurement and Mobility Considering Beamforming (2017) (Year: 2017).*
3GPP "3rd Generation Partnership Project; Technical Specification Group Radio Access Network; Study on New Radio Access Technology Physical Layer Aspects (Release 14)", TR 38.802 V14.0.0. Mar. 2017.
ASUSTEK, Consideration on measurement reporting for NR mobility, R2-1701446, 3GPP TSG-RAN WG2 Meeting #97, Athens, Greece, Feb. 13-17, 2017.
CATT, Further consideration on RRM measurement, R2-1700220, 3GPP TSG RAN WG2 Meeting Ad Hoc, Spokane, USA, Jan. 17-19, 2017.
CMCC, "Beam Related Measurement Report and Inter-cell HO in NR", 3GPP TSG-RAN WG2 Meeting #97, R2-1701921, Athens, Greece, Feb. 13-17, 2017.
CMCC, Beam and cell RRM measurements, R4-1700968, 3GPP TSG-RAN WG4 Meeting #82, Athens, Greece, Feb. 13-17, 2017.
Huawei, et al., Measurement and Mobility Considering Beamforming, R2-1701130, 3GPP TSG-RAN2 Meeting #97, Athens, Greece, Feb. 13-17, 2017.
NTT DOCOMO, Inc., Discussion on mobility procedure for NR, R1-1700615, 3GPP TSG RAN WG1 NR Adhoc, Spokane, USA Jan. 16-20, 2017.
ZTE, et al., Group based beam management for NR-MIMO, R1-1701798, 3GPP TSG RAN WG1 Meeting #88, Athens, Greece, Feb. 13-17, 2017.

* cited by examiner

MEASUREMENT REPORTING ENHANCEMENTS IN BEAM BASED SYSTEMS

PRIORITY CLAIM

This application is a Continuation of U.S. application Ser. No. 16/497,237 filed Sep. 24, 2019, now U.S. patent Ser. No. 11/929,793, which is a 371 of International Application No. PCT/IB2018/052001, filed Mar. 23, 2018, which claims the benefit of U.S. Provisional Application No. 62/476,396, filed Mar. 24, 2017, the disclosures of which are fully incorporated herein by reference.

TECHNICAL FIELD

Embodiments presented herein relate to wireless communication, and in particular to methods, network nodes, wireless devices, user equipment, computer programs, computer program products, or virtual devices for measurement reporting in beam based systems.

BACKGROUND

Mobility execution in LTE

In Long Term Evolution (LTE) the user equipment assists the network in making handover decisions based on cell-level measurement reports. More specifically, In LTE, an RRC_CONNECTED UE may perform a handover from a serving cell to a target cell by receiving from the serving cell a handover command. The handover command may be an RRCConnectionReconfiguration message that contains all the necessary information for the UE to access the target cell. For example, the message may contain such information as the target's physical cell identifier (PCI) and the Random Access Channel (RACH) configuration of the target cell.

In the RRC specification set forth in 3GPP TS 36.331, the above information is encoded in the mobilityControlInfo information element (IE) present in the RRCConnectionReconfiguration message. This information indicates to the UE a handover. For the RACH information, there is a part that is common, part of the IE radioResourceConfigCommon and another optional part that is dedicated (e.g. a UE-specific preamble for a contention-free random access) encoded in rach-ConfigDedicated. Some of these IEs are highlighted below.

If the mobilityControlInfo contains the dedicated RACH information, the UE will use it for contention-free random access to the target cell, which should expect a given preamble, otherwise the UE should simply perform a contention-based random access per the configuration provided in the common RACH configuration, which is part of mobilityControlInfo.

Mobility Execution in the New 5G Radio (NR)

NR is to be designed as a system to support a wide range of frequencies, including bands where beamforming should be used to improve coverage and/or at least to boost the data channel Signal to Interference plus Noise Ratio (SINR) so that the UE is able to transmit and receive messages with very high data rates. With respect to mobility in RRC_CONNECTED state, 3GPP WG RAN2 made the following agreement in RAN2 #97 meeting in Athens: "Access information (e.g. RACH configuration) for the target cell is provided in the HO command to enable the UE to access the cell without reading system information. Access information may include beam specific information (if any)." And, in the RAN #96 meeting in Reno, the following has been agreed: "1: At least cell id and all information required to access the target cell will be included in the HO command; 2: for at least some cases information required for contention based and contention free access can be included in the HO command; and 3: To be studied what beam related information of the target cell may be required."

With respect to the question of what beam related information of the target cell may be require and, consequently, how should that information be used by the UE accessing that target cell, existing solutions rely on either Option 1 the UE reporting too little information that leads to inefficient usage of resources at the target cell or Option 2 too much information that requires complex processing, configuration, and standardization and provides something that is not really useful. In any of these cases the UE in NR would detect cells based on synchronizations (SS) Block Sets. The UE would collect a sample and, for a given cell, the UE would detect multiple beams, one per SS block. For example, as shown in FIG. 1, the UE may be able to consider at least a whole SS Block Burst Set before deriving a cell value RSRP to be used as input to L1 filtering. In the illustrated scenario, the UE is able to detect 5 beams in one snapshot per cell (beams #4, #6, #9, #10, and #12, which are above a pre-defined SINR enabling the UE to distinguish them). The UE then performs SINR calculations and/or RSRP per beam in the Set.

In option 1 the UE combines the computed RSRP values per beam, for example, averaging the N strongest/best beams (where N can be configured by the network), and derives a cell quality RSRP value per sample. That is provided as input to the layer one (L1) filter which then provides a L1 filtered value to layer 3 (L3) which then performs yet another filtering that is controlled/configured by the RRC layer. The UE then discards the beam level RSRP values per sample. In the next sample the UE performs a similar task and so on. The measurement model in that case is shown in FIG. 2. In this option, only cell level measurements are provided for use in triggering events and only cell level quality is sent to the network via measurement reports.

Taking handover decisions based on reports constructed on option 1 does not enable the network to identify anything about the beams associated with the target cell that the UE has measured. Thus, when the target node needs to prepare a handover command associated with a target cell, it has to either provide RACH information for all possible/allowed SS blocks and allocate dedicated preambles per SS Block for that incoming UE (which is a waste of RACH resources since UE will only access one) or rely on contention-based access (which comes at the risk of having random access (RA) collisions by two or more UEs). In addition, the target may not control which beam the UE is allowed to access. In addition, the serving cell, even before deciding for a handover, cannot prioritize cells with more or less beams.

In option 2, regardless of how the UE combines the computed RSRP values per beam to derive cell quality, the UE still needs to maintain filtered values per beam. At each sample the UE needs to store the RSRP value per beam, provide to a dedicated per beam L1 filter which may further provide as input to a dedicated per beam L3 filter which could then be used at L3. In that case, the UE could still trigger events based on cell level quality however, unlike in option 1, here it could include these per beam RSRP values in the measurement reports. With the additional information provided from the UE to the serving network node and potentially to the target serving node the serving node can indeed take potentially more educated decisions compared to option 1 and enable the target to allocate resources more efficiently. However, the cost of option 2 is extremely high in the sense that the UE would need to maintain a high number of per beam filtering processes that is quite unpredictable. For example, in a first sample the UE could detect beams #1, #2, #3, and start the filtering, then in the second the UE detects beams 4, 5, 6, etc. Hence, not only the number of beams can vary from sample to sample but also the occurrence of specific beams so that L3 would have to manage/control all different errors cases and scenarios.

SUMMARY

An object of embodiments herein is to allow a wireless device to provide measurement reports that include beam measurement information. The beam measurement information may allow for better management of the network. According to certain embodiments, a method performed by a wireless device for measurement reporting includes detecting a first number of beams. The method also includes measuring one or more characteristics of a second number of beams. The second number of beams comprises one or more beams of the first number of beams. The method additionally includes generating a measurement report that includes beam measurement information derived from the measurement of the one or more characteristics of the second number of beams. The method further includes transmitting the measurement report with the beam measurement information to a network node.

In some embodiments, the first number of beams are associated with a first cell. Furthermore, generating the measurement report may comprise generating an indication of a cell quality of the first cell based on at least some of the first number of beams associated with first cell.

In some embodiments, generating the measurement report comprises generating a second measurement report. The first measurement report comprises beam measurement information and the second measurement report comprises the indication of cell quality.

In certain embodiments, the method may further include providing the measurements of the one or more characteristics of the second number of beams for layer 3 processing. In such embodiments, the method may additionally include deriving beam measurement information based on the output of the layer 3 processing.

In particular embodiments, layer 3 processing may include receiving the one or more characteristics of the second number of beams and performing layer 3 filtering of the one or more characteristics of the second number of beams.

In some embodiments, the method may additionally include managing the measurements of the one or more characteristics of the second number of beams until a triggering event is detected.

In certain embodiments, the method may further include receiving a message comprising a beam reporting configuration. The measurement report may be generated based on the beam reporting configuration.

In some embodiments, the beam measurement information may include one or more beam identifiers per cell, or one or more beam identifiers per cell and associated beam measurements.

In some certain embodiments, the method may further include storing the measurements of the one or more characteristics of the second number of beams.

According to some embodiments disclosed herein, a method for measurement reporting includes generating at a network node a message comprising a beam reporting configuration specifying how a first wireless device is to construct a measurement report. The method further includes receiving at a wireless device the message comprising the beam reporting configuration. The method additionally includes measuring, at the wireless device, one or more characteristics of a first number of beams. The method further includes generating layer 1 cell quality value by processing at least some of the one or more characteristics. The method additionally includes, upon the beam reporting configuration specifying only layer 1 reporting, discarding the one or more characteristics after layer 1 processing and generating a measurement report comprising the cell quality value. Upon the beam reporting configuration specifying layer 3 processing in addition to layer 1 processing, the method includes selecting one or more beams to be included in the measurement report. For the selected beams, the method additionally includes generating layer 3 beam measurement information for the selected one or more beams based on at least some of the one or more characteristics and generating a measurement report comprising the cell quality value and the beam measurement information. The method additionally includes transmitting to the network node the measurement report. The method further includes receiving, at the network node, the measurement report. The method also includes modifying one or more network configuration parameter based on the received measurement report.

According to some embodiments disclosed herein, a wireless device for reporting comprises a wireless interface configured to detect a first number of beams. The wireless device also comprises processing circuitry configured to measure one or more characteristics of a second number of beams. The second number of beams includes one or more beams of the first number of beams. The processing circuitry is further configured to generate a measurement report that includes beam measurement information derived from the measurement of the one or more characteristics of the second number of beams. The wireless interface is further configured to transmit the measurement report with the beam measurement information to a network node.

According to some embodiments disclosed herein, a wireless device for measurement reporting comprises processing circuitry and a computer readable medium comprising instructions executable by the processing circuitry. The wireless device comprises a receive unit configured to detect a first number of beams. The wireless device also includes a measurement unit configured to measure one or more characteristics of a second number of beams. The second number of beams includes one or more beams of the first number of beams. The wireless device also includes a report unit configured to generate a measurement report that includes beam measurement information derived from the measurement of the one or more characteristics of the second number of beams. The wireless device further includes a transmit unit configured to transmit the measurement report with the beam measurement information to a network node.

Advantageously one or more embodiments disclosed herein provide one or more mechanisms which allow a wireless device to send measurement reports with varying levels of information ranging from L1 to L3 at multiple samples. The content of the measurement reports may be adjusted by L3 processing based on beam reporting configuration received from a network node. The reports may be adjusted to the needs of the serving cell and/or any potential target cells. Depending on the embodiment and/or scenario, the measurement repots may include beam level information, beam identification, cell level information, or any combination thereof. Depending on the embodiment and/or scenario, the measurement repots may be sent and/or the requirements of the report modified based on network needs or conditions. The embodiments disclosed herein may simplify the processing done by the wireless as compared to those solutions in which the wireless device always keeps filtered measurements per beam. The embodiments disclosed herein may also simplify network configuration. This may avoid the need to have to configure the filtering parameters on a per beam basis. These comparative benefits may be provided while also allowing the same or similar results to be achieved as the other solutions to which the embodiments disclosed herein have been compared.

It is to be noted that any feature of any of the above embodiments may be applied to any other embodiment, wherever appropriate. Likewise, any advantage of any of the embodiments may apply to the other embodiments, and vice versa. Other objectives, features and advantages of the enclosed embodiments will be apparent from the following detailed disclosure, attached claims, and drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Particular embodiments are now described, by way of example, with reference to the accompanying drawings, in which.

DETAILED DESCRIPTION

Some of the embodiments contemplated by the claims will now be described more fully hereinafter with reference to the accompanying drawings. Other embodiments, however, are contained within the scope of the claims and the claims should not be construed as limited to only the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
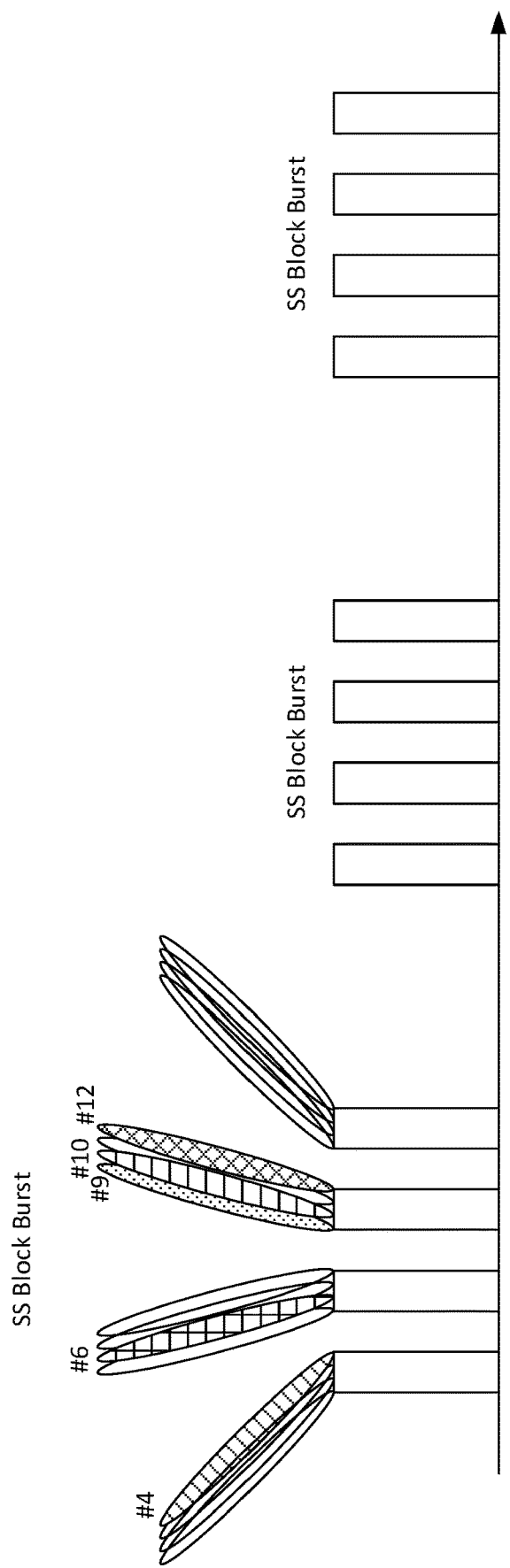
FIG. 1 is a representation of an SS Block Burst Set according to particular embodiments.
Figure 2:
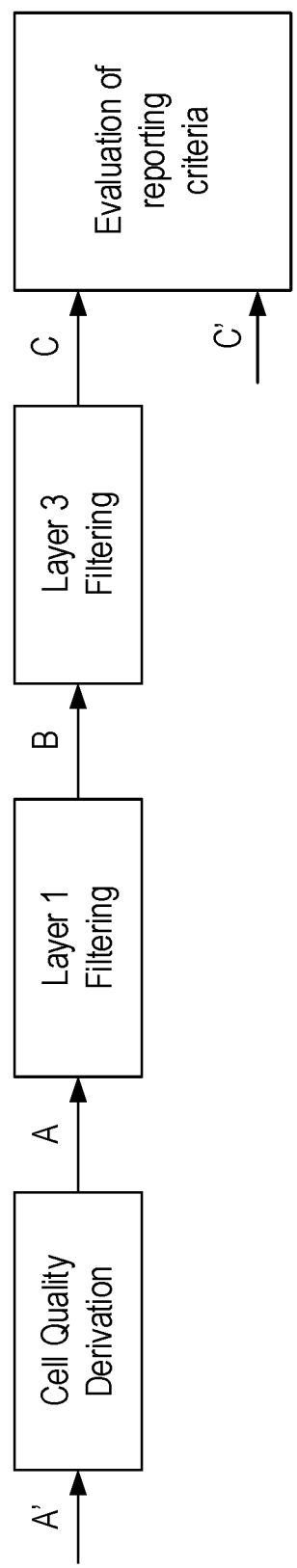
FIG. 2 is a measurement model flow diagram, in accordance with prior art.
Figure 3:
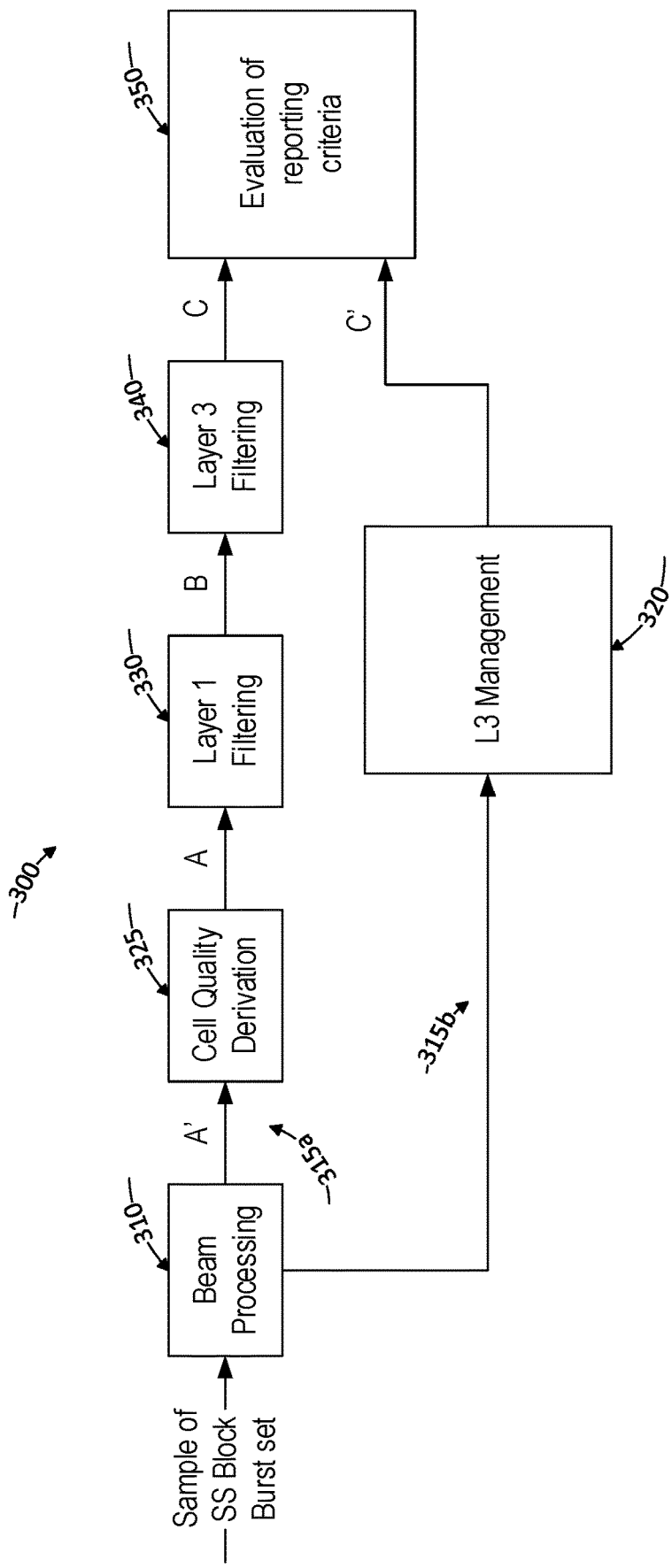
FIG. 3 is a measurement model flow diagram, in accordance with particular embodiments.

FIG. 3 depicts a measurement model flow diagram, in accordance with particular embodiments. Measurement model 300 depicted in FIG. 3 is based on a wireless device (WD), such as WD 410 or UE 500 performing per beam measurements at beam processing 310 and then providing those measurements to cell quality derivation 325 and L3 management 320. This is done on a per sample basis, with L3 management 320 managing the measurements to provide beam measurement information and cell quality derivation 325 combining the measurements to define a cell quality value. The cell quality value is then processed by L1 filtering 330 and then L3 filtering 340. The results of all the above processing may then be reported to the network as determined at evaluation of reporting criteria 350. The beams processed at beam processing 310 may be samples of beams from an SS block burst set (e.g., from PBCH and/or tertiary synchronization sequence TSS). Then, instead of discarding these per beam measurements (e.g., RSRP values) the UE may, at 315b, provide at least some of these to L3 to be managed at L3 management 320 and included in measurement reports as determined at reporting criteria evaluation 350 to improve, in an efficient manner, the beam level information at the serving and/or target nodes.

During beam processing 310 the WD may perform its measurements on a sample of SS block burst set(s). From the sampling, the WD may detect one or more beams per detected cell. For those detected beams, or a subset thereof, the WD may perform one or more quality metrics, such as performing RSRP on the beams at beam processing 310. The information collected by beam processing 310 may, at 315a, be passed to cell quality derivation 325 for determining a cell quality value and, at 315b, to L3 management where the results may then be stored, processed, or otherwise managed. L3 management 320 may obtain one or multiple of the following pieces of information: (1) the number of detected beams having a quality metric value that is above a threshold; (2) an identification of specific beams (e.g., those detected by the WD, those processed at beam processing 310, those having a quality metric value above the threshold, etc.); (3) specific beam-level quality metric values (e.g., RSRP) (the beam-level values may be provided if requested or otherwise, in some cases that are either pre-determined or provided by the network). By storing beam measurement values, it may be possible to generate snapshot values for CBRA selection since contention-free RACH allocation should be done as such, instead of doing it per filtered values. This may allow the UE to check the best-beam at the time of executing the handover based on snapshot values instead of filtered values. This may reduce the chance that any delay introduced by the filtering is not affecting the 'best' beam selection.

Upon receiving the beam-level measurement information post beam processing 310, L3 management 320 may manage this information according a variety of different schemes such as managing the information for periodic reporting, reporting in response to a request from the network, or reporting in response to an event (e.g., a triggering event). For example, the WD may manage the information until an event, such as the cell level measurements reaching a certain value, then at least some of the information managed at L3 management 320 may be reported. The L3 management by the WD may depend on the information that is provided from L1. L3 management 320 may further manage the beam measurement information by performing various calculations, filtering, determinations, etc. in anticipation of future measurement reports.

In some embodiments, if L1 provides the number of detected beams per cell per sample, L3 management may use this information by keeping a distribution of this value and then performing statistical analysis on this data (e.g., average, standard derivation, distributions, etc.). The results of this L3 processing may be included in measurement reports. In some embodiments, L3 may simply record the latest value of this number. One or multiple of these could be included in the measurement report. How L3 processes information from L1 could depend on the network configuration.

In some embodiments, if at 315b L1 provides L3 with specific beam indications per cell (e.g., an identifier associated with the beams and/or the SS block with which the beams are associated) on a per sample basis, L3 may have a few additional options for how to manage the received information. For example, L3 management 320 may store the most recent beam indications. For example, if at sample 1, L1 sends beam indexes 1, 7, and 5, and then at sample 2 it sends beam indexes 5, 8, and 12, then a measurement report for that particular cell that is triggered at sample 2 would only report indexes 5, 8, 12. The target cell can then use the identifiers to allocate to the handover of the WD dedicated resources associated with the reported beams. Another example of how L3 may use the information provided by L1, is to count the number of occurrences of each beam of a cell within a given evaluation interval. For example, if L1 sends beam indexes 1, 7, 5 at sample 1 and 5, 8, 12 at sample 2, then L3 may store in its memory that beam 5 has been measured twice and beams 1, 7, 8, and 12 have been measured once. Similar to the previous example, when the target node associated with the target cell receives the report with this information, the network node may be able to use the information to better allocate resources. For example, it may allocate dedicated resources to all the identified beams, just those beams that have been identified more than X times, the beam that has been identified the highest number of times, etc. As another example, in the case of more congestion, the target node may use this information to select one or more beams that the UE should get dedicated resources.

In some embodiments, the information passed from L1 to L3 management 320 and added to the measurement report can also be used by the target node to trigger more localized transmissions of narrow beams transmitting CSI-RS. This may allow, for example, the WD to perform narrow beam measurements on target cells or enable handover with narrow beam selection. For example, if the WD reports to a serving node the cell value RSRP and beam indications based on SS Blocks 1 and 2, the serving node can request the target node to turn on or configure CSI-RS processes so that the target node knowing the beams from SS Blocks 1 and 2 could send CSI-Rs processes in beams that overlap the beams from SS Blocks 1 and 2 at least to avoid a full sweeping.

In some embodiments, L3 management 320 may use the specific per sample beam-level RSRP values provided by beam processing 310 from L1, to derive any of the previous information (number of beams or beam indications) and include them in the measurement reports. In the case of the RSRP values per beam, there may be a variety of ways to manage the L3 filters. For example, L3 management 320 may store the most recent values and discard beams that do not repeat in the next sample. As another example, L3 management 320 may accumulate a predetermined number of the filtered values. The actual number may depend on configuration and/or device capabilities.

On the network side, with measurement reports that contain cell based RSRP and statistics concerning the number of detected beams per sample the network may be able to try to minimize the number of ping-pong handovers and handover failures by prioritizing neighbour cells to becomes target cells with more beams being detected by the UE. The network may also collect statistics in a certain area and, once it has detected a high number of ping-pongs or failures, especially for certain cells, it can configure specific cells at the L3 at the UE to subscribe to for specific events to be indicated from L1 such as this number of beams per sample. For example, at position-A (a geographic position), a serving cell can configure the UE to perform L3 beam management to take the most recent samples for beams related to neighbour cell-X whereas the serving cell can configure the UE to perform L3 beam management to take filtered samples for neighbour cell-Y related beams. Then at position-B, the serving cell can configure the UE to perform L3 beam management to take the most recent samples for beams related to neighbour cell-Y whereas the serving cell can configure the UE to perform beam L3 management to take filtered samples for neighbour cell-X related beams.

Any of the embodiments, scenarios, or options discussed above may be configured in a variety of different ways. Some of the possible ways of configuring the WD may include the network providing (e.g., via a configuration message) the WD with the configurations. This may be done in response to some need or triggering event or based on aspects of a relevant standard. The configuration message may be based on the policies or rules of the network operator associated with target node and/or the source node. Another possible way is that the WD may be pre-configured (e.g., by a manufacturer of the WD, or a specific operator with which the WD is associated) based on requirements of a standard. As a more specific example, in some embodiments, the beam level information provided by the WD in the measurement reports could be configured by the network depending on the needs of the serving and/or target nodes. For example, if the serving cell has detected that ping-pongs are occurring from a given cell, it can configure the WD to include in the measurement reports for that particular cell or cells one of the indications described above. As another example, if the target cell and/or node and/or any neighbour candidates have some loaded cells, the current source node may request that the WD include per beam information in the next measurement report. If the target and serving nodes are aware that in certain areas the WD's measurements per beam are more stable these beams could be requested so that even better load balancing decisions can be made. For example, if the RSRP values of beam-X is varying slowly i.e., the rate of change of RSRP values is low for that beam, then it is a stable beam and the UE can be moved to this beam. In contrast, if the RSRP values of beam-X is varying quickly i.e., the rate of change of RSRP values is large for that beam, then it is not a stable beam and not a candidate to move the UE. Although the subject matter described herein may be implemented in any appropriate type of device, or combination of devices, using any suitable components, the embodiments disclosed herein are described in relation to a wireless network, such as the example wireless network illustrated in FIG. 4. The wireless network may provide communication and other types of services to one or more wireless devices to facilitate the wireless devices' access to and/or use of the services provided by, or via, the wireless network. For simplicity, the wireless network of FIG. 4 only depicts network 406, network nodes 460 and 460b, and WDs 410, 410b, and 410c. In practice, a wireless network may further include any additional elements or devices suitable to support communication between wireless devices or between a wireless device and another communication device, such as a landline telephone, a network operator, a service provider, or any other network node or end device. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 406 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Of the illustrated components, network node 460 and wireless device (WD) 410 are depicted with additional detail. In particular, network node 460 and WD 410 comprise various components described in more detail below. These components work together to provide network node and/or wireless device functionality, such as providing wireless connections in a wireless network.

As used herein, a network node may refer to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, NodeBs, evolved NodeBs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

Figure 4:
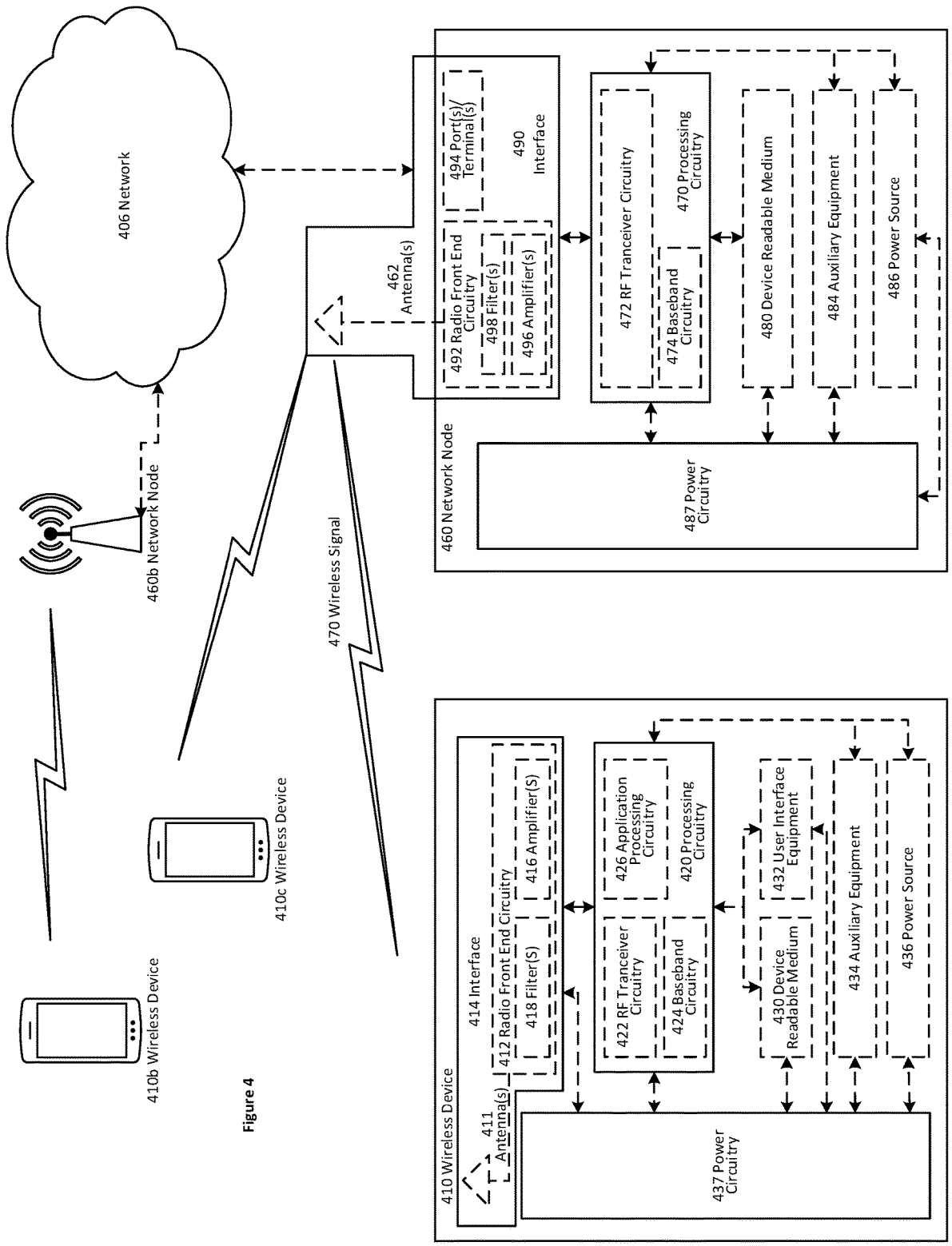
FIG. 4 is a block diagram of a wireless networks, in accordance with particular embodiments.

As illustrated in FIG. 4, network node 460 includes processing circuitry 470, device readable medium 480, interface 490, auxiliary equipment 484, power source 486, power circuitry 487, and antenna 462. Although network node 460 illustrated in the example wireless network of FIG. 4 may represent a device that includes the illustrated combination of hardware components, other embodiments may comprise network nodes with different combinations of components. It is to be understood that a network node should not be limited to the illustrated components but comprises any suitable combination of hardware and/or software needed to perform the tasks, features, functions and methods disclosed herein. Moreover, while the components of network node 460 are depicted as single boxes located within a larger box, or nested within multiple boxes, in practice, a network node may comprise multiple different physical components that make up a single illustrated component (e.g., device readable medium 480 may comprise multiple separate hard drives as well as multiple RAM modules).

Similarly, network node 460 may be composed of multiple physically separate components (e.g., a NodeB component and a RNC component, or a BTS component and a BSC component, etc.). Each separate component may have its own respective components. In certain scenarios in which network node 460 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 460 may be configured to support multiple radio access technologies (RATs). In such embodiments, some components may be duplicated (e.g., separate device readable medium 480 for the different RATs) and some components may be reused (e.g., the same antenna 462 may be shared by the RATs). Network node 460 may also include multiple sets of the various illustrated components for different wireless technologies integrated into network node 460, such as, for example, GSM, WCDMA, LTE, NR, Wi-Fi, or Bluetooth wireless technologies. These wireless technologies may be integrated into the same or different chip or set of chips and other components within network node 460.

Processing circuitry 470 is configured to perform any determining, calculating, or similar operations (e.g., certain obtaining operations) described herein as being provided by a network node. These operations performed by processing circuitry 470 may include processing information obtained by processing circuitry 470 by, for example, converting the obtained information into other information, comparing the obtained information or converted information to information stored in the network node, and/or performing one or more operations based on the obtained information or converted information, and as a result of said processing making a determination.

Processing circuitry 470 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 460 components, such as device readable medium 480, network node 460 functionality. For example, processing circuitry 470 may execute instructions stored in device readable medium 480 or in memory within processing circuitry 470. Such functionality may include providing any of the various wireless features, functions, or benefits discussed herein. In some embodiments, processing circuitry 470 may include a system on a chip (SOC).

In some embodiments, processing circuitry 470 may include one or more of radio frequency (RF) transceiver circuitry 472 and baseband processing circuitry 474. In some embodiments, radio frequency (RF) transceiver circuitry 472 and baseband processing circuitry 474 may be on separate chips (or sets of chips), boards, or units, such as radio units and digital units. In alternative embodiments, part or all of RF transceiver circuitry 472 and baseband processing circuitry 474 may be on the same chip or set of chips, boards, or units In certain embodiments, some or all of the functionality described herein as being provided by a network node, base station, eNB or other such network device may be performed by processing circuitry 470 executing instructions stored on device readable medium 480 or memory within processing circuitry 470. In alternative embodiments, some or all of the functionality may be provided by processing circuitry 470 without executing instructions stored on a separate or discrete device readable medium, such as in a hard-wired manner. In any of those embodiments, whether executing instructions stored on a device readable storage medium or not, processing circuitry 470 can be configured to perform the described functionality. The benefits provided by such functionality are not limited to processing circuitry 470 alone or to other components of network node 460 but are enjoyed by network node 460 as a whole, and/or by end users and the wireless network generally.

Device readable medium 480 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 470. Device readable medium 480 may store any suitable instructions, data or information, including a computer program, software, an application including one or more of logic, rules, code, tables, etc. and/or other instructions capable of being executed by processing circuitry 470 and, utilized by network node 460. Device readable medium 480 may be used to store any calculations made by processing circuitry 470 and/or any data received via interface 490. In some embodiments, processing circuitry 470 and device readable medium 480 may be considered to be integrated.

Interface 490 is used in the wired or wireless communication of signalling and/or data between network node 460, network 406, and/or WDs 410. As illustrated, interface 490 comprises port(s)/terminal(s) 494 to send and receive data, for example to and from network 406 over a wired connection. Interface 490 also includes radio front end circuitry 492 that may be coupled to, or in certain embodiments a part of, antenna 462. Radio front end circuitry 492 comprises filters 498 and amplifiers 496. Radio front end circuitry 492 may be connected to antenna 462 and processing circuitry 470. Radio front end circuitry 492 may be configured to condition signals communicated between antenna 462 and processing circuitry 470. Radio front end circuitry 492 may receive digital data that is to be sent out to other network nodes or WDs via a wireless connection. Radio front end circuitry 492 may convert the digital data into a radio signal having the appropriate channel and bandwidth parameters using a combination of filters 498 and/or amplifiers 496. The radio signal may then be transmitted via antenna 462. Similarly, when receiving data, antenna 462 may collect radio signals which are then converted into digital data by radio front end circuitry 492. The digital data may be passed to processing circuitry 470. In other embodiments, the interface may comprise different components and/or different combinations of components.

In certain embodiments, network node 460 may not include separate radio front end circuitry 492, instead, processing circuitry 470 may comprise radio front end circuitry and may be connected to antenna 462 without separate radio front end circuitry 492. Similarly, in some embodiments, all or some of RF transceiver circuitry 472 may be considered a part of interface 490. In still other embodiments, interface 490 may include one or more ports or terminals 494, radio front end circuitry 492, and RF transceiver circuitry 472, as part of a radio unit (not shown), and interface 490 may communicate with baseband processing circuitry 474, which is part of a digital unit (not shown).

Antenna 462 may include one or more antennas, or antenna arrays, configured to send and/or receive wireless signals. Antenna 462 may be coupled to radio front end circuitry 490 and may be any type of antenna capable of transmitting and receiving data and/or signals wirelessly. In some embodiments, antenna 462 may comprise one or more omni-directional, sector or panel antennas operable to transmit/receive radio signals between, for example, 2 GHZ and 66 GHZ. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 462 may be separate from network node 460 and may be connectable to network node 460 through an interface or port.

Antenna 462, interface 490, and/or processing circuitry 470 may be configured to perform any receiving operations and/or certain obtaining operations described herein as being performed by a network node. Any information, data and/or signals may be received from a wireless device, another network node and/or any other network equipment. Similarly, antenna 462, interface 490, and/or processing circuitry 470 may be configured to perform any transmitting operations described herein as being performed by a network node. Any information, data and/or signals may be transmitted to a wireless device, another network node and/or any other network equipment.

Power circuitry 487 may comprise, or be coupled to, power management circuitry and is configured to supply the components of network node 460 with power for performing the functionality described herein. Power circuitry 487 may receive power from power source 486. Power source 486 and/or power circuitry 487 may be configured to provide power to the various components of network node 460 in a form suitable for the respective components (e.g., at a voltage and current level needed for each respective component). Power source 486 may either be included in, or external to, power circuitry 487 and/or network node 460. For example, network node 460 may be connectable to an external power source (e.g., an electricity outlet) via an input circuitry or interface such as an electrical cable, whereby the external power source supplies power to power circuitry 487. As a further example, power source 486 may comprise a source of power in the form of a battery or battery pack which is connected to, or integrated in, power circuitry 487. The battery may provide backup power should the external power source fail. Other types of power sources, such as photovoltaic devices, may also be used.

Alternative embodiments of network node 460 may include additional components beyond those shown in FIG. 4 that may be responsible for providing certain aspects of the network node's functionality, including any of the functionality described herein and/or any functionality necessary to support the subject matter described herein. For example, network node 460 may include user interface equipment to allow input of information into network node 460 and to allow output of information from network node 460. This may allow a user to perform diagnostic, maintenance, repair, and other administrative functions for network node 460.

As used herein, a wireless device (WD) may refer to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2), vehicle-to-everything (V2X) and may in this case be referred to as a D2D communication device. As yet another specific example, in an Internet of Things (IOT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IOT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile.

As illustrated, wireless device 410 includes antenna 411, interface 414, processing circuitry 420, device readable medium 430, user interface equipment 432, auxiliary equipment 434, power source 436 and power circuitry 437. WD 410 may include multiple sets of one or more of the illustrated components for different wireless technologies supported by WD 410, such as, for example, GSM, WCDMA, LTE, NR, Wi-Fi, WiMAX, or Bluetooth wireless technologies, just to mention a few. These wireless technologies may be integrated into the same or different chips or set of chips as other components within WD 410.

Antenna 411 may include one or more antennas or antenna arrays, configured to send and/or receive wireless signals, and is connected to interface 414. In certain alternative embodiments, antenna 411 may be separate from WD 410 and be connectable to WD 410 through an interface or port. Antenna 411, interface 414, and/or processing circuitry 420 may be configured to perform any receiving or transmitting operations described herein as being performed by a WD. Any information, data and/or signals may be received from a network node and/or another WD. In some embodiments, radio front end circuitry and/or antenna 411 may be considered an interface.

As illustrated, interface 414 comprises radio front end circuitry 412 and antenna 411. Radio front end circuitry 412 comprise one or more filters 418 and amplifiers 416. Radio front end circuitry 414 is connected to antenna 411 and processing circuitry 420, and is configured to condition signals communicated between antenna 411 and processing circuitry 420. Radio front end circuitry 412 may be coupled to or a part of antenna 411. In some embodiments, WD 410 may not include separate radio front end circuitry 412; rather, processing circuitry 420 may comprise radio front end circuitry and may be connected to antenna 411. Similarly, in some embodiments, some or all of RF transceiver circuitry 422 may be considered a part of interface 414. Radio front end circuitry 412 may receive digital data that is to be sent out to other network nodes or WDs via a wireless connection. Radio front end circuitry 412 may convert the digital data into a radio signal having the appropriate channel and bandwidth parameters using a combination of filters 418 and/or amplifiers 416. The radio signal may then be transmitted via antenna 411. Similarly, when receiving data, antenna 411 may collect radio signals which are then converted into digital data by radio front end circuitry 412. The digital data may be passed to processing circuitry 420. In other embodiments, the interface may comprise different components and/or different combinations of components.

The components of wireless interface 414 may be used to detect a first number of beams. The beams may be provided by network node 460 and/or network node 460b. The beams may be associated with one cell or multiple cells. The beams may be part of an SS block burst set. Wireless interface 414 may also be configured to transmit the measurement report to network node 460. Depending on the beam reporting configuration, the measurement report may comprise a cell quality value, beam measurement information or both.

Processing circuitry 420 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 410 components, such as device readable medium 430, WD 410 functionality. Such functionality may include providing any of the various wireless features or benefits discussed herein. For example, processing circuitry 420 may execute instructions stored in device readable medium 430 or in memory within processing circuitry 420 to provide the functionality disclosed herein.

As illustrated, processing circuitry 420 includes one or more of RF transceiver circuitry 422, baseband processing circuitry 424, and application processing circuitry 426. In other embodiments, the processing circuitry may comprise different components and/or different combinations of components. In certain embodiments processing circuitry 420 of WD 410 may comprise a SOC. In some embodiments, RF transceiver circuitry 422, baseband processing circuitry 424, and application processing circuitry 426 may be on separate chips or sets of chips. In alternative embodiments, part or all of baseband processing circuitry 424 and application processing circuitry 426 may be combined into one chip or set of chips, and RF transceiver circuitry 422 may be on a separate chip or set of chips. In still alternative embodiments, part or all of RF transceiver circuitry 422 and baseband processing circuitry 424 may be on the same chip or set of chips, and application processing circuitry 426 may be on a separate chip or set of chips. In yet other alternative embodiments, part or all of RF transceiver circuitry 422, baseband processing circuitry 424, and application processing circuitry 426 may be combined in the same chip or set of chips. In some embodiments, RF transceiver circuitry 422 may be a part of interface 414. RF transceiver circuitry 422 may condition RF signals for processing circuitry 420.

In certain embodiments, some or all of the functionality described herein as being performed by a WD may be provided by processing circuitry 420 executing instructions stored on device readable medium 430, which in certain embodiments may be a computer-readable storage medium. In alternative embodiments, some or all of the functionality may be provided by processing circuitry 420 without executing instructions stored on a separate or discrete device readable storage medium, such as in a hard-wired manner. In any of those particular embodiments, whether executing instructions stored on a device readable storage medium or not, processing circuitry 420 can be configured to perform the described functionality. The benefits provided by such functionality are not limited to processing circuitry 420 alone or to other components of WD 410, but are enjoyed by WD 410 as a whole, and/or by end users and the wireless network generally.

Processing circuitry 420 may be configured to perform any determining, calculating, or similar operations (e.g., certain obtaining operations) described herein as being performed by a WD. These operations, as performed by processing circuitry 420, may include processing information obtained by processing circuitry 420 by, for example, converting the obtained information into other information, comparing the obtained information or converted information to information stored by WD 410, and/or performing one or more operations based on the obtained information or converted information, and as a result of said processing making a determination.

In certain embodiments, processing circuitry 420 may measure one or more characteristics of all, or some, of the beams detected by wireless interface 414. The beam specific measurements may include SINR and/or RSRP calculations. These measurements may then be used separately by L1 and L3. In particular, L1 may use the beam measurements to derive a cell quality value. The cell quality value is a value representing a combination of the different measured beams for that cell. For example, the cell quality value may be based on the average measured value for all the measured beams associated with a cell. Of note, the L1 processing does not provide details regarding how the cell quality value was determined. That is, the number of beams, the identity of the beams, the individual values of individual beams are all lost or missing from the cell quality value. L3 processing, on the other hand, retains the individual beam measurements and then is able to provide a variety of different types of additional information. For example, the identity of the beams, statistics about the beams, historical data about the beams, individual beam values, beam snapshots, etc.

Processing circuitry 420 may then use the results of the L1 and/or L3 processing to generate a measurement report. That is, processing circuitry may generate a measurement report that has beam measurement information and/or cell quality information. The content of the measurement report may be based on beam reporting configuration information. In some scenarios, the beam reporting configuration may be received from network node 460 via wireless interface 414. For example, the network node may specify that the measurement report should include cell quality value plus the identity of each beam used to derive the cell quality value; or the cell quality value plus the individual beam values used to derive the cell quality value. In some embodiments, the beam reporting configuration may be predetermined or preconfigured and stored by device readable medium 430.

Depending on the embodiment, scenario, and/or reporting configuration, processing circuitry 420 may use the same or different beam measurement values for determining the cell quality and beam measurement information. For example, when determining the cell quality value processing circuitry 420 may use the X best beams, or all beams, of the beams detected by wireless interface 414. When determining the beam measurement information, processing circuitry may use information associated with the beams used for the cell quality value, it may use historical information or trends associated with the cell for which the cell quality value was determined, it may use a subset (e.g., the best, worst, etc.) of the beams used for the cell quality value, or any other such use as may be apparent. In some embodiments, each measurement report may be associated with a particular cell. Thus, the cell quality information may be for a particular cell even if beams from other cells were detected, and the beam measurement information may be based on the beams associated with that particular cell. Depending on the scenario, the beam measurement information and the cell quality value may be provided together in a single measurement report or separately in different measurement reports. In some cases, one or more measurement reports with only cell quality values maybe sent between measurement reports with beam measurement information (or beam measurement information and a cell quality value).

Depending on the embodiment, scenario, and/or reporting configuration, processing circuitry 420 may manage the beam specific measurement values in a variety of different ways. It may manage the values so that they are ready to be provided in a measurement report. This may involve managing the beam measurement values until a triggering even occurs that calls for a measurement report with beam measurement information. It may involve managing the beam measurement values to be provided in each measurement report, or every Xth measurement report where X is an integer (e.g., every $5^{th}$ measurement report may contain beam measurement information). In some embodiments, processing circuitry may store the values in device readable medium 430. It may also manage the type of information that is prepared for the measurement report. For example, it may include the identifiers that are part of the cell quality report, or it may include the identifiers and the corresponding associated beam measurement values for the beams used for the cell quality value.

In some embodiments, the beam measurement information may be determined by L3 processing done by processing circuitry 420. This may involve L3 filtering of the one or more measured characteristics that it receives. For example, in some embodiments, time domain filtering may be applied where OUTPUT(n)=alpha*sample(n)+(1-alpha)*OUTPUT(n−1) where alpha is configured by L3, also called RRC protocol layer.

Device readable medium 430 may be operable to store a computer program, software, an application including one or more of logic, rules, code, tables, etc. and/or other instructions capable of being executed by processing circuitry 420. Device readable medium 430 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 420. In some embodiments, processing circuitry 420 and device readable medium 430 may be considered to be integrated.

User interface equipment 432 may provide components that allow for a human user to interact with WD 410. Such interaction may be of many forms, such as visual, audial, tactile, etc. User interface equipment 432 may be operable to produce output to the user and to allow the user to provide input to WD 410. The type of interaction may vary depending on the type of user interface equipment 432 installed in WD 410. For example, if WD 410 is a smart phone, the interaction may be via a touch screen; if WD 410 is a smart meter, the interaction may be through a screen that provides usage (e.g., the number of gallons used) or a speaker that provides an audible alert (e.g., if smoke is detected). User interface equipment 432 may include input interfaces, devices and circuits, and output interfaces, devices and circuits. User interface equipment 432 is configured to allow input of information into WD 410, and is connected to processing circuitry 420 to allow processing circuitry 420 to process the input information. User interface equipment 432 may include, for example, a microphone, a proximity or other sensor, keys/buttons, a touch display, one or more cameras, a USB port, or other input circuitry. User interface equipment 432 is also configured to allow output of information from WD 410, and to allow processing circuitry 420 to output information from WD 410. User interface equipment 432 may include, for example, a speaker, a display, vibrating circuitry, a USB port, a headphone interface, or other output circuitry. Using one or more input and output interfaces, devices, and circuits, of user interface equipment 432, WD 410 may communicate with end users and/or the wireless network, and allow them to benefit from the functionality described herein.

Auxiliary equipment 434 is operable to provide more specific functionality which may not be generally performed by WDs. This may comprise specialized sensors for doing measurements for various purposes, interfaces for additional types of communication such as wired communications etc. The inclusion and type of components of auxiliary equipment 434 may vary depending on the embodiment and/or scenario.

Power source 436 may, in some embodiments, be in the form of a battery or battery pack. Other types of power sources, such as an external power source (e.g., an electricity outlet), photovoltaic devices or power cells, may also be used. WD 410 may further comprise power circuitry 437 for delivering power from power source 436 to the various parts of WD 410 which need power from power source 436 to carry out any functionality described or indicated herein. Power circuitry 437 may in certain embodiments comprise power management circuitry. Power circuitry 437 may additionally or alternatively be operable to receive power from an external power source; in which case WD 410 may be connectable to the external power source (such as an electricity outlet) via input circuitry or an interface such as an electrical power cable. Power circuitry 437 may also in certain embodiments be operable to deliver power from an external power source to power source 436. This may be, for example, for the charging of power source 436. Power circuitry 437 may perform any formatting, converting, or other modification to the power from power source 436 to make the power suitable for the respective components of WD 410 to which power is supplied.

The foregoing description of various features and functionality of certain embodiments was, for purposes of simplicity, focused on the components illustrated in FIG. 4. However, as is readily apparent, the features and functionality described above are equally applicable to other embodiments, including those illustrated in FIGS. 5 and 6. Accordingly, for simplicity, the illustrated components of FIGS. 5 and 6 will be described in general as it is understood that they are readily adaptable to provide any of the features or functionality described above with respect to FIG. 4.

Figure 5:
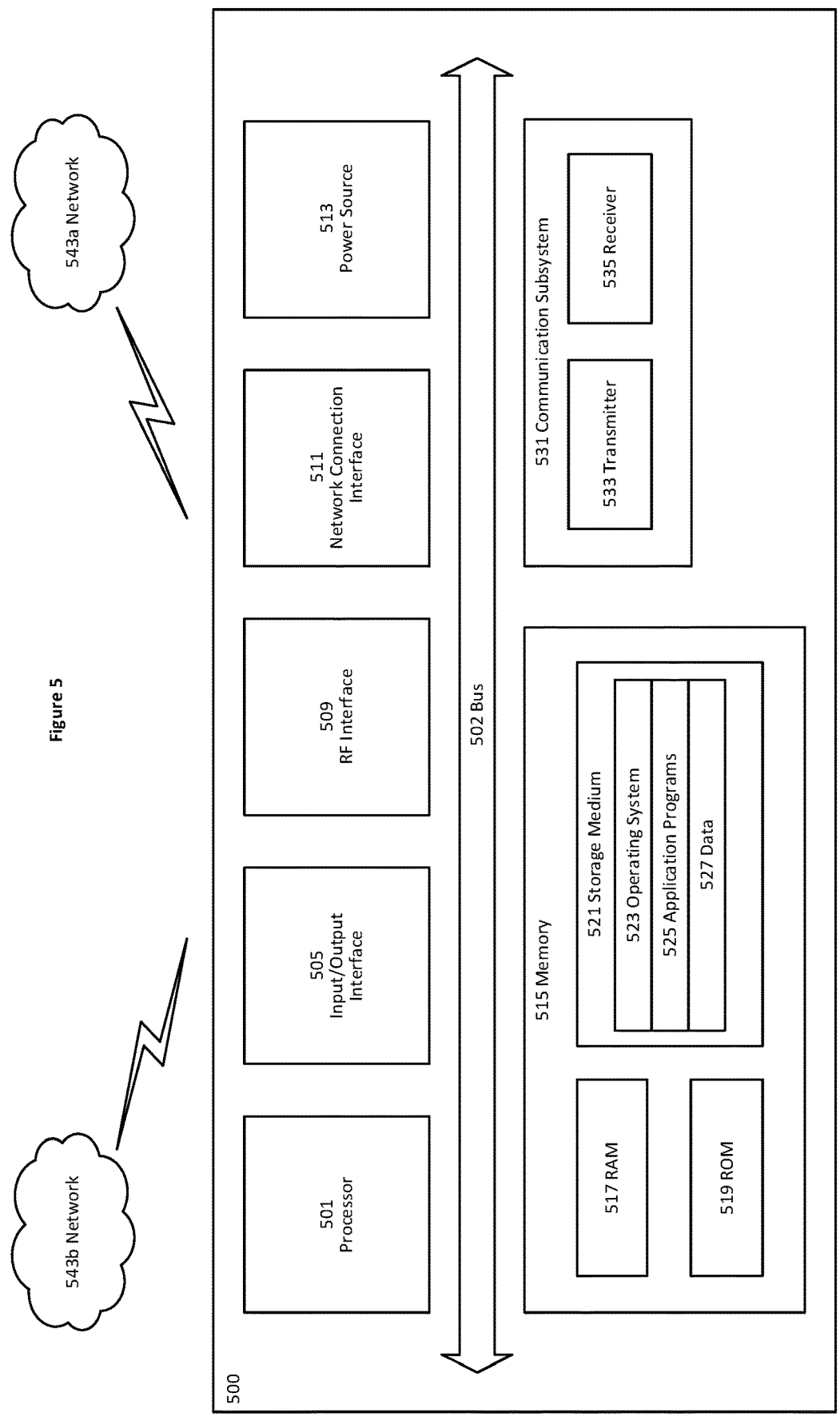
FIG. 5 is a block diagram of a UE, in accordance with particular embodiments.

FIG. 5 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 5200 may be any UE identified by the 3rd Generation Partnership Project (3GPP), including a NB-IOT UE, a machine type communication (MTC) UE, and/or an enhanced MTC (eMTC) UE. UE 500, as illustrated in FIG. 5, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 5 is a UE, the components discussed herein are equally applicable to a WD, and vice-versa.

In FIG. 5, UE 500 includes processing circuitry 501 that is operatively coupled to input/output interface 505, radio frequency (RF) interface 509, network connection interface 511, memory 515 including random access memory (RAM) 517, read-only memory (ROM) 519, and storage medium 521 or the like, communication subsystem 531, power source 533, and/or any other component, or any combination thereof. Storage medium 521 includes operating system 523, application program 525, and data 527. In other embodiments, storage medium 521 may include other similar types of information. Certain UEs may utilize all of the components shown in FIG. 5, or only a subset of the components. The level of integration between the components may vary from one UE to another UE. Further, certain UEs may contain multiple instances of a component, such as multiple processors, memories, transceivers, transmitters, receivers, etc.

In FIG. 5, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In the depicted embodiment, input/output interface 505 may be configured to provide a communication interface to an input device, output device, or input and output device. UE 500 may be configured to use an output device via input/output interface 505. An output device may use the same type of interface port as an input device. For example, a USB port may be used to provide input to and output from UE 500. The output device may be a speaker, a sound card, a video card, a display, a monitor, a printer, an actuator, an emitter, a smartcard, another output device, or any combination thereof. UE 500 may be configured to use an input device via input/output interface 505 to allow a user to capture information into UE 500. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, RF interface 509 may be configured to provide a communication interface to RF components such as a transmitter, a receiver, and an antenna. Network connection interface 511 may be configured to provide a communication interface to network 543a. Network 543a may encompass wired and/or wireless networks such as a local-area network (LAN), a wide-area network (WAN), a computer network, a wireless network, a telecommunications network, another like network or any combination thereof. For example, network 543a may comprise a Wi-Fi network. Network connection interface 511 may be configured to include a receiver and a transmitter interface used to communicate with one or more other devices over a communication network according to one or more communication protocols, such as Ethernet, TCP/IP, SONET, ATM, or the like. Network connection interface 511 may implement receiver and transmitter functionality appropriate to the communication network links (e.g., optical, electrical, and the like). The transmitter and receiver functions may share circuit components, software or firmware, or alternatively may be implemented separately.

RAM 517 may be configured to interface via bus 502 to processing circuitry 501 to provide storage or caching of data or computer instructions during the execution of software programs such as the operating system, application programs, and device drivers. ROM 519 may be configured to provide computer instructions or data to processing circuitry 501. For example, ROM 519 may be configured to store invariant low-level system code or data for basic system functions such as basic input and output (I/O), start-up, or reception of keystrokes from a keyboard that are stored in a non-volatile memory. Storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 521 may be configured to include operating system 523, application program 525 such as a web browser application, a widget or gadget engine or another application, and data file 527. Storage medium 521 may store, for use by UE 500, any of a variety of various operating systems or combinations of operating systems.

Storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 521 may allow UE 500 to access computer-executable instructions, application programs or the like, stored on transitory or non-transitory memory media, to off-load data, or to upload data. An article of manufacture, such as one utilizing a communication system may be tangibly embodied in storage medium 521, which may comprise a device readable medium.

In FIG. 5, processing circuitry 501 may be configured to communicate with network 543b using communication subsystem 531. Network 543a and network 543b may be the same network or networks or different network or networks. Communication subsystem 531 may be configured to include one or more transceivers used to communicate with network 543b. For example, communication subsystem 531 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software or firmware, or alternatively may be implemented separately.

In the illustrated embodiment, the communication functions of communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 531 may include cellular communication, Wi-Fi communication, Bluetooth communication, and GPS communication. Network 543b may encompass wired and/or wireless networks such as a local-area network (LAN), a wide-area network (WAN), a computer network, a wireless network, a telecommunications network, another like network or any combination thereof. For example, network 543b may be a cellular network, a Wi-Fi network, and/or a near-field network. Power source 513 may be configured to provide alternating current (AC) or direct current (DC) power to components of UE 500.

The features, benefits and/or functions described herein may be implemented in one of the components of UE 500 or partitioned across multiple components of UE 500. Further, the features, benefits, and/or functions described herein may be implemented in any combination of hardware, software or firmware. In one example, communication subsystem 531 may be configured to include any of the components described herein. Further, processing circuitry 501 may be configured to communicate with any of such components over bus 502. In another example, any of such components may be represented by program instructions stored in memory that when executed by processing circuitry 501 perform the corresponding functions described herein. In another example, the functionality of any of such components may be partitioned between processing circuitry 501 and communication subsystem 531. In another example, the non-computationally intensive functions of any of such components may be implemented in software or firmware and the computationally intensive functions may be implemented in hardware.

Figure 6:
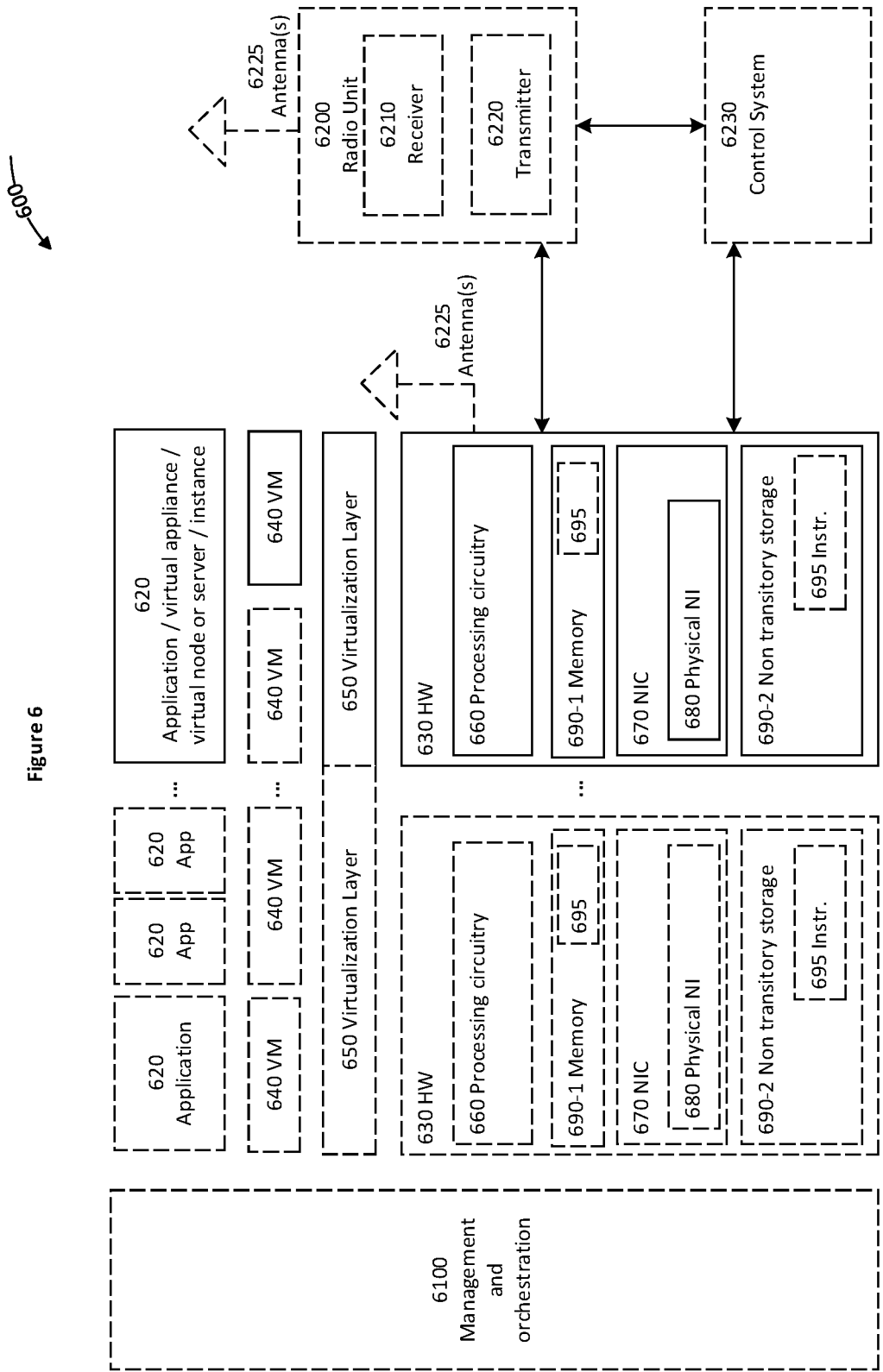
FIG. 6 is a block diagram of a virtualization environment in accordance with particular embodiments.

FIG. 6 is a block diagram illustrating a virtualization environment 600 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 600 hosted by one or more of hardware nodes 630. Further, in embodiments in which the virtual node is not a radio access node or does not require radio connectivity (e.g., a core network node), then the network node may be entirely virtualized.

The functions may be implemented by one or more applications 620 (which may alternatively be called software instances, virtual appliances, network functions, virtual nodes, virtual network functions, etc.) operative to implement some of the features, functions, and/or benefits of some of the embodiments disclosed herein. Applications 620 are run in virtualization environment 600 which provides hardware 630 comprising processing circuitry 660 and memory 690. Memory 690 contains instructions 695 executable by processing circuitry 660 whereby application 620 is operative to provide one or more of the features, benefits, and/or functions disclosed herein.

Virtualization environment 600, comprises general-purpose or special-purpose network hardware devices 630 comprising a set of one or more processors or processing circuitry 660, which may be commercial off-the-shelf (COTS) processors, dedicated Application Specific Integrated Circuits (ASICs), or any other type of processing circuitry including digital or analog hardware components or special purpose processors. Each hardware device may comprise memory 690-1 which may be non-persistent memory for temporarily storing instructions 695 or software executed by processing circuitry 660. Each hardware device may comprise one or more network interface controllers (NICs) 670, also known as network interface cards, which include physical network interface 680. Each hardware device may also include non-transitory, persistent, machine-readable storage media 690-2 having stored therein software 695 and/or instructions executable by processing circuitry 660. Software 695 may include any type of software including software for instantiating one or more virtualization layers 650 (also referred to as hypervisors), software to execute virtual machines 640 as well as software allowing it to execute functions, features and/or benefits described in relation with some embodiments described herein.

Virtual machines 640, comprise virtual processing, virtual memory, virtual networking or interface and virtual storage, and may be run by a corresponding virtualization layer 650 or hypervisor. Different embodiments of the instance of virtual appliance 620 may be implemented on one or more of virtual machines 640, and the implementations may be made in different ways.

During operation, processing circuitry 660 executes software 695 to instantiate the hypervisor or virtualization layer 650, which may sometimes be referred to as a virtual machine monitor (VMM). Virtualization layer 650 may present a virtual operating platform that appears like networking hardware to virtual machine 640.

As shown in FIG. 6, hardware 630 may be a standalone network node with generic or specific components. Hardware 630 may comprise antenna 6225 and may implement some functions via virtualization. Alternatively, hardware 630 may be part of a larger cluster of hardware (e.g. such as in a data center or customer premise equipment (CPE)) where many hardware nodes work together and are managed via management and orchestration (MANO) 6100, which, among others, oversees lifecycle management of applications 620.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 640 may be a software implementation of a physical machine that runs programs as if they were executing on a physical, non-virtualized machine. Each of virtual machines 640, and that part of hardware 630 that executes that virtual machine, be it hardware dedicated to that virtual machine and/or hardware shared by that virtual machine with others of the virtual machines 640, forms a separate virtual network elements (VNE).

Still in the context of NFV, Virtual Network Function (VNF) is responsible for handling specific network functions that run in one or more virtual machines 640 on top of hardware networking infrastructure 630 and corresponds to application 620 in FIG. 6.

In some embodiments, one or more radio units 6200 that each include one or more transmitters 6220 and one or more receivers 6210 may be coupled to one or more antennas 6225. Radio units 6200 may communicate directly with hardware nodes 630 via one or more appropriate network interfaces and may be used in combination with the virtual components to provide a virtual node with radio capabilities, such as a radio access node or a base station.

In some embodiments, some signalling can be affected with the use of control system 6230 which may alternatively be used for communication between the hardware nodes 630 and radio units 6200.

Figure 7:
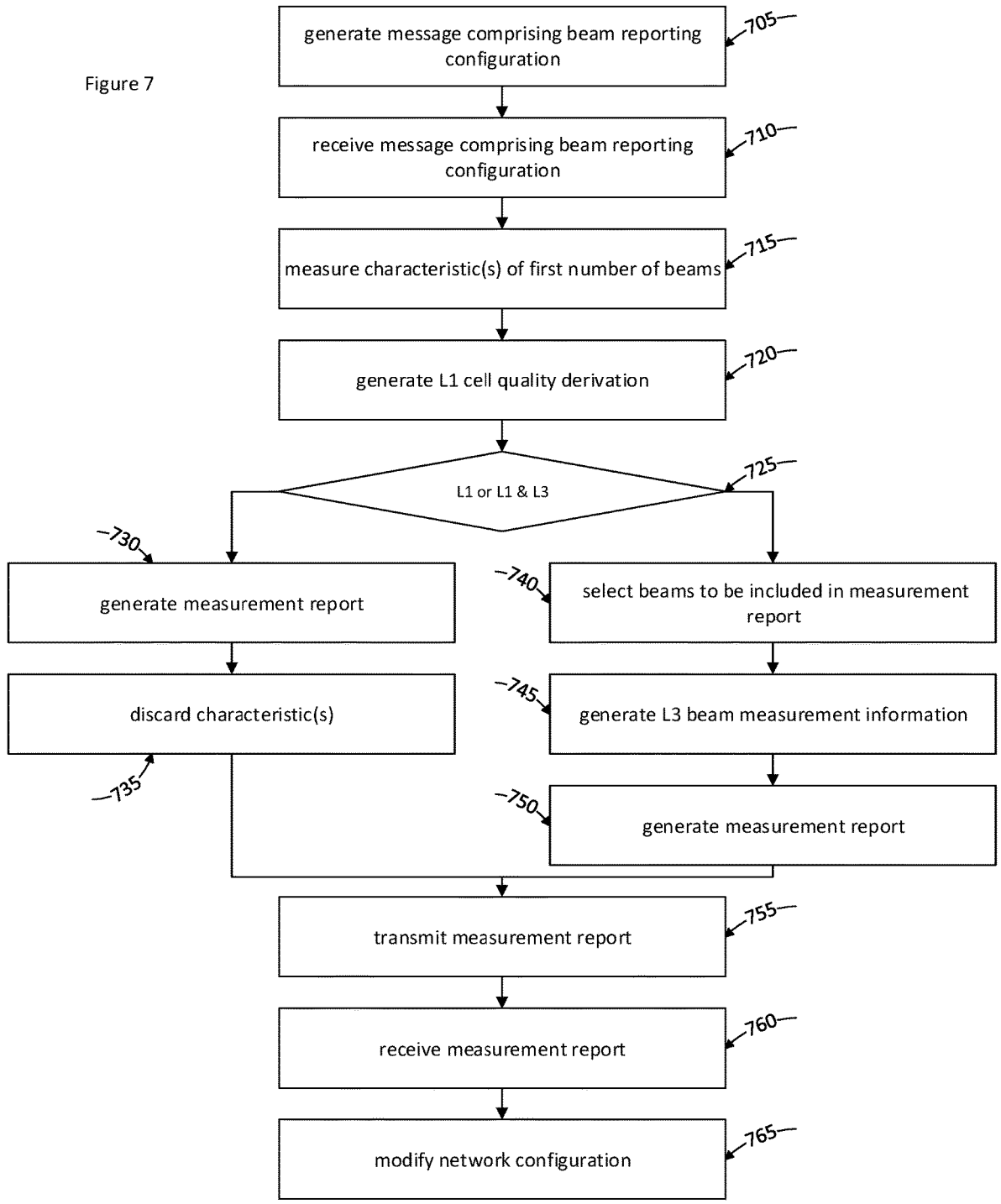
FIG. 7 depicts a flowchart of a first method in accordance with particular embodiments.

FIG. 7 depicts a flowchart in accordance with particular embodiments. The method depicted in the flowchart of FIG. 7 begins at step 705 with a network node generating a message that includes a beam reporting configuration. The beam reporting configuration specifies how the network node wants a wireless device to construct a measurement report. For example, beam reporting configuration may specify that the measurement report should contain a cell quality value as well the identification of the beams used in generating the cell quality value; or the cell quality value as well as the beam measurement values and associated beam identifiers used to generate the cell quality value. This may allow the network node to specify the type of information that is reported depending on the situation and needs of the network node, or the wireless network. The beam reporting configuration may be unique to a specific wireless device, or it may be generally applicable to multiple, or all, wireless devices.

At step 710 the wireless device receives the message containing the beam reporting configuration. The message may be received via a wireless signal. The message may be an RRC message.

At step 715 the wireless device measures one or more characteristics of a first number of beams. The actual number of beams may depend on a variety of factors such as the configuration of the wireless device, the physical surroundings of the wireless device, etc. In some embodiments, the wireless device may detect nearby cells based on SS Block Sets. The wireless device may then collect a sample of one or more beams for a given cell. The wireless device may then perform SINR calculations and/or RSRP per beam in the SS Block Set.

At step 720 the wireless device generates a layer 1 (L1) cell quality by processing at least some of the one or more characteristics that were measured at step 715. The cell quality may be derived in a manner similar to traditional processes for deriving cell quality. For example, the wireless device may first combine computed RSRP values per beam (e.g., averaging the N strongest/best beams (where N can be configured by the network)). The combined value may then be an input to an L1 filter which then provides an L1 filtered value to L3 which then performs additional filtering which may be controlled or configured by the RRC layer.

At decision step 725 the method continues down one of two paths depending on whether the beam reporting configuration message specifies only L1 reporting or both L1 and L3 reporting.

If the beam reporting configuration specifies only L1 reporting, then at step 730 the wireless device generates a measurement report based on the cell quality derivation performed at step 720. Then, depending on information in the beam reporting configuration, the wireless device may discard the one or more characteristics measured at step 715. In some embodiments (not illustrated in FIG. 7) the measurements may be stored for future use, even if only the L1 cell quality value is reported.

If the beam reporting configuration specifies for the wireless device to perform L1 and L3 processing, then at step 740 the wireless device selects one or more beams to be included in the measurement report. This may be based on a number of different factors such as network configuration (e.g., the network node may have specified the beams to include) measurement results (e.g., the wireless device may pick the X best beams), what is to be reported as part of the L1 processing for the cell quality, etc.

At step 745 the wireless device generates L3 beam measurement information for the beams selected at step 740. The beam measurement information may be based on the measured characteristics from step 715 associated with the beams selected at step 740. The beam measurement information generated at step 745 may include such information as the number of beams and/or an identity of the beams used to generate the L1 cell quality value; one or more measured characteristics for the selected number of beams (e.g., individual beam quality values prior to these values being combined or averaged for cell quality reporting).

At step 750 the wireless device generates a measurement report. The measurement report may comprise a single report with both the L3 beam measurement information and the L1 cell quality value. In some embodiments, the measurement report may comprise separate reports for the L1 cell quality value and the L3 beam measurement information.

At step 755 the wireless device sends the measurement report to the network node. The measurement report sent at step 755 may be the report generated at step 750 or the measurement report generated at step 730 depending on the beam reporting configuration.

At step 760 the network node receives the measurement report. At step 765 the network node, directly or indirectly, modifies one or more network configuration parameter based on the received measurement report. For example, the network node may initiate a handover procedure for the wireless device.

Figure 8:
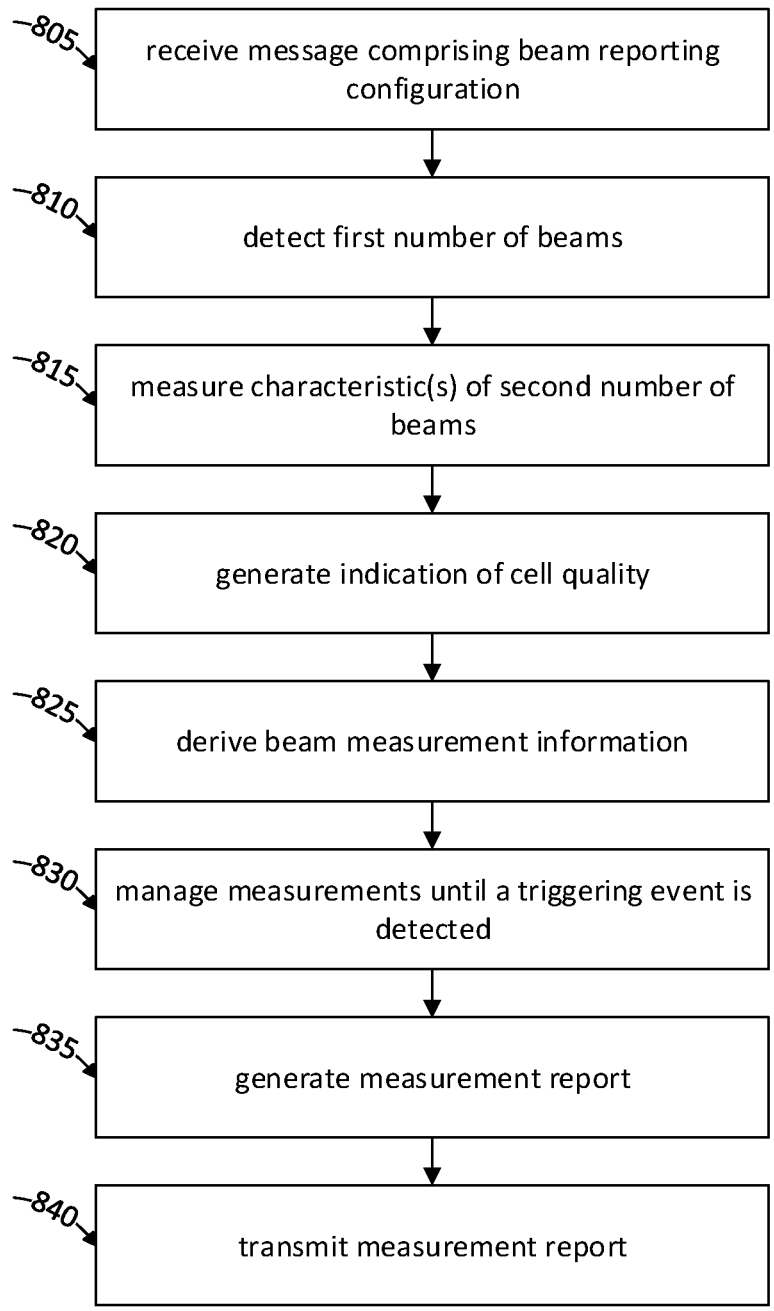
FIG. 8 depicts a flowchart of a second method in accordance with particular embodiments.

FIG. 8 depicts a flowchart of a second method in accordance with particular embodiments. Unlike FIG. 7, which included steps from both a wireless device and a network node perspective, the flowchart of FIG. 8 is focused on the perspective of a wireless device.

The method begins at step 805 with the wireless device receiving a message that includes a beam reporting configuration. The beam reporting configuration may specify the type of reporting (e.g., L1 only, L1 and L3), how that reporting is to be constructed (e.g., number of beams, types of beam measurement information, etc.) and when the reporting is to be done (e.g., periodically, in response to a triggering event, etc.). In some embodiments, the wireless device may have preconfigured or default beam reporting configuration. In such embodiments, the method may start at step 810. Depending on the embodiment and scenario, the beam reporting configuration may specify that the wireless device is to i) report beam IDs or ii) beam IDs+measurements per beam associated with the respective beam IDs (i.e. RSRP and/or RSRQ and/or SINR). These may be reported alone or with a cell quality value. By alerting the wireless device as to how the measurement report is to be constructed, the wireless device is aware of what it should do to generate or derive the specified information. The network can use this information to better manage the wireless network.

At step 810 the wireless device detects a first number of beams. The detected beams may be associated with one or more different cells. The detected beams may be associated with one or more SS Block Sets.

At step 815 the wireless device measures one or more characteristics of a second number of beams. The second number of beams includes one or more of the first number of beams. Depending on the conditions and/or configuration of the wireless device, the second number of beams may be equal to or less than the first number of beams. The second number of beams does not include any beams not part of the first number of beams detected at step 810.

At step 820 the wireless device generates an indication of cell quality. The cell quality indication may be generated by processing at least some of the one or more characteristics of the second number of beams. This may generally be referred to herein as L1 processing. The cell quality indication may be generated in a manner similar to traditional processes for deriving cell quality. For example, the wireless device may first combine computed RSRP values per beam (e.g., averaging the N strongest/best beams (where N can be configured by the network)). The combined value may then be an input to an L1 filter which then provides an L1 filtered value to L3 which then performs additional filtering which may be controlled or configured by the RRC layer. Of note, the cell quality indication generated in this fashion does not include any beam specific information. That is, the cell quality indication does not include any identifiable information on the number, identity, or quality of the individual beams that went into generating the cell quality indication. For example, one good beam and one bad beam may produce the same cell quality indication as three average beams. In some embodiments, if the wireless device does not receive a message with the beam reporting configuration (or a beam reporting configuration has not been otherwise specified), the wireless device may simply discard the measured characteristics once the cell quality indication has been generated.

At step 825 the wireless device determines the beam measurement information. Beam measurement information may include beam identifiers, beam quality values, statistics based on the number, quality and/or identification of the beams, L3 filtered beam measurements, beam identifiers derived from L3 filtered beam measurements, aggregated value(s) derived from the beam measurement information described above (e.g., the number of beams fulfilling certain criteria) or any combination thereof. In some embodiments, the beam measurement information may be derived by providing the characteristics measured at step 815 for L3 processing. Among other L3 functions, the L3 processing may include L3 filtering. For example, in some embodiments, time domain filtering may be applied where OUTPUT(n)=alpha*sample(n)+(1-alpha)*OUTPUT(n−1) where alpha is configured by L3, also called RRC protocol layer.

The type of beam measurement information that is derived at step 825 may be based on the beam reporting configuration received at step 805. In some embodiments, the way beam measurement information is derived may be based on a separate configuration provided by the network node (e.g., separate from the beam reporting configuration).

In some embodiments, the wireless device may perform a beam selection function to select the beams to be included in the measurement report and thus what beam measurement information should be derived to generate the specified measurement report. For example, the wireless device may select the best+X−1 best beams above a threshold, where X is defined per cell and X and threshold are part of the beam reporting configuration.

At step 830 the wireless device manages the measurements of the one or more characteristics of the second number of beams until a triggering event is detected. For example, the wireless device may simply provide the network node with traditional cell quality reporting until it detects a triggering event such as a possible need for a handover. While the wireless device is providing the network with the traditional measurement reports containing cell quality, the wireless device may be storing the beam measurement information and performing various analytics on the stored data in anticipation of a future triggering event. For example, the wireless device may manage the stored measurements by identifying cells with a large gap between the best and worst beams, or cells that provide a few strong individual beams but whose other beams are of poor quality. As another example, the wireless device may track the number of good beams for each cell, or what percentage of a cell's beams are good. A host of other examples may be apparent. The wireless device may continue to manage this information until it is needed for a measurement report. In some embodiments, the beam measurement information may be provided automatically or in response to a request from the network, in which case, the method may not include step 830, rather the method may simply go from step 825 to 835.

At step 835 the wireless device generates a measurement report. The measurement report may include beam measurement information derived from the measurement of the one or more characteristics of the second number of beams. In some scenarios, the wireless device may generate separate measurement reports for the cell quality and the beam measurement information. In some embodiments, the measurement report may include the cell quality value along with the beam measurement information. That is, the beam measurement information may supplement the cell quality indication to provide the network node with a better picture of the signal quality of the beams the wireless device is receiving. For example, the measurement report may include the cell quality indication (RSRP, RSRQ, SINR, etc.) for a particular cell, along with the beam identifiers for the beams of that cell. As another example, the measurement report may include the cell quality indication (RSRP, RSRQ, SINR, etc.) for a particular cell, along with the beam identifiers and the corresponding beam specific quality indications. The timing and content of the measurement report may be based on information in the beam reporting configuration received from the network node. For example, the beam reporting configuration may include a parameter such as "includeBeamMeasurements:" If this is TRUE, the wireless device includes both beam IDs and their associated measurements; if FALSE, only the beam IDs are included. In some embodiments, the beam measurement information in the measurement report may be the beams associated with the cell for which the cell quality indication is generated.

At step 840 the wireless device transmits the measurement report with the beam measurement information to the network node.

Figure 9:
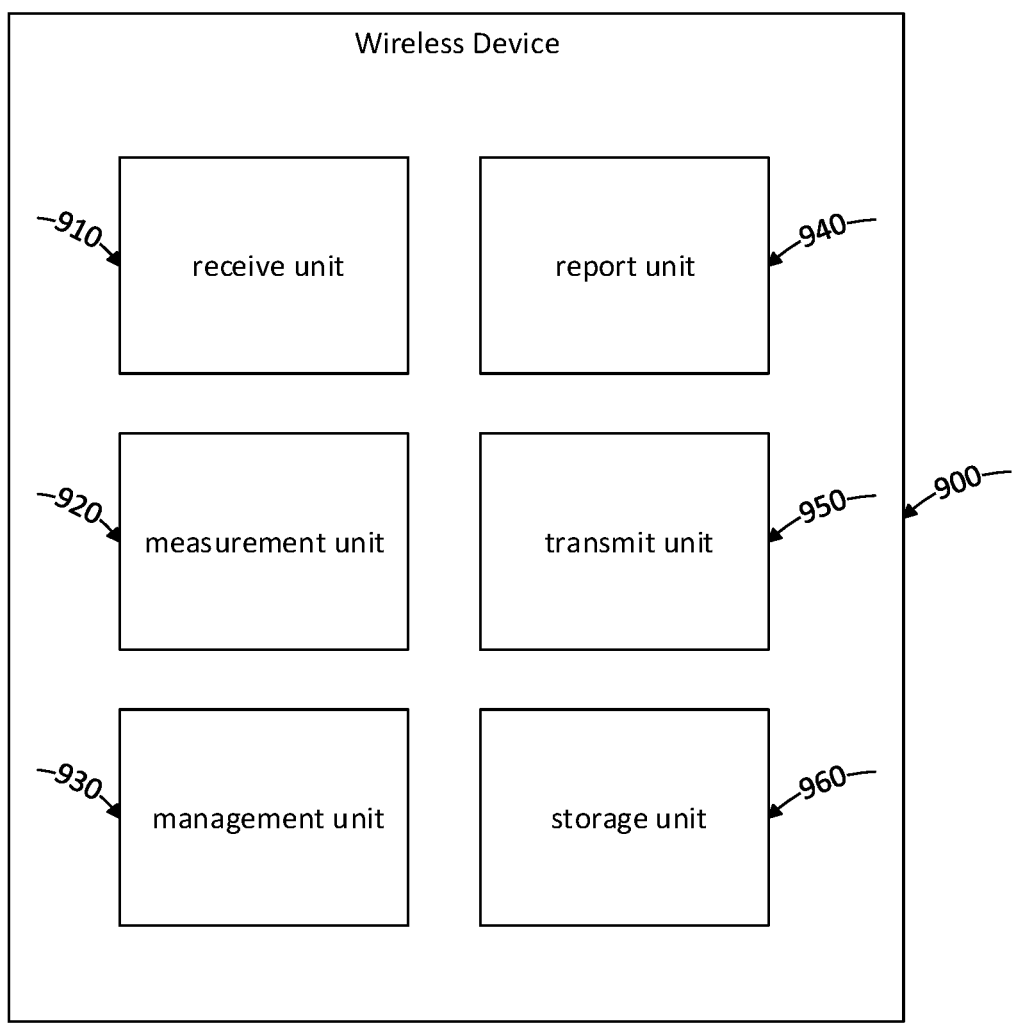
FIG. 9 depicts a block diagram of a wireless device in accordance with particular embodiments.

FIG. 9 depicts a block diagram of a wireless device in accordance with particular embodiments. Wireless device 900 may be implemented in a wireless device such as wireless device 410 or 500 shown in FIGS. 4 and 5, respectively. Wireless device 900 is configured to carry out all or some of the methods depicted in FIGS. 7 and 8 as well as any other processes or methods disclosed herein.

Wireless device 900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receive unit 910, measurement unit 920, management unit 930, report unit 940, transmit unit 950, storage unit 960, and any other suitable units of wireless device 900 to perform corresponding functions according one or more embodiments of the present disclosure.

As illustrated in FIG. 9, wireless device 900 includes receive unit 910, measurement unit 920, management unit 930, report unit 940, transmit unit 950, and storage unit 960. Receive unit 910 is configured to detect a first number of beams. This may be similar to step 810 of FIG. 8. Receive unit 910 may also be configured to receive a message comprising a beam reporting configuration. This may be similar to step 805 of FIG. 8. Measurement unit 920 may be configured to measure one or more characteristics of a second number of beams. This may be similar to step 815 of FIG. 8. Management unit 930 may be configured to manage the measurements of the one or more characteristics of the second number of beams until a triggering event is detected. This may be similar to step 830 of FIG. 8. Report unit 940 may be configured to generate a measurement report that includes beam measurement information derived from the measurement of the one or more characteristics of the second number of beams. This may be similar to step 835 of FIG. 8. Report unit 940 may also be configured to generate an indication of a cell quality of the first cell based on at least some of the first number of beams associated with the first cell. This may be similar to step 820 of FIG. 8. Report unit 940 may also be configured to generate a second measurement report that comprises the indication of cell quality. This may be discussed in step 835 of FIG. 8. Transmit unit 950 may be configured to transmit the measurement report with the beam measurement information to a network node. This may be similar to step 840 of FIG. 8. Storage unit 960 may be configured to store the measurements of the one or more characteristics of the second number of beams. This may be similar to the storage discussed in relation to step 830 of FIG. 8.

In view of the above disclosure, at least some of the herein disclosed embodiments may provide a way for a wireless device to provide the network with beam measurement information to allow the network to better manage its wireless resources. Certain aspects of the inventive concept have mainly been described above with reference to a few embodiments. However, as is readily appreciated by a person skilled in the art, embodiments other than the ones disclosed above are equally possible and within the scope of the inventive concept, as defined by the appended claims. Similarly, while a number of different combinations of components and steps have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

The invention claimed is:

1. A method at a wireless device for measurement reporting comprising:
   detecting a first number of beams associated with a first cell;
   processing a subset of the first number of beams, the processing providing a cell quality associated with the first cell;
   performing layer 3 filtering on the cell quality;
   performing layer 3 filtering on beam measurements of the first number of beams;
   generating a measurement report, the measurement report comprising the cell quality that was layer 3 filtered, the beam measurements that were layer 3 filtered, and one or more identifiers; and
   transmitting the measurement report to a network node.

2. The method of claim 1, further comprising detecting a second number of beams, the second number of beams greater than the first number.

3. The method of claim 1, further comprising:
   detecting, at the wireless device, a triggering event; and
   transmitting, to the network node, the measurement report after the triggering event is detected.

4. The method of claim 1, further comprising receiving a handover command, the handover command generated based on the measurement report.

5. The method of claim 1 wherein the measurement report comprises:
   one or more beam identifiers per cell, or
   one or more beam identifiers per cell and associated beam measurements.

6. The method of claim 1, further comprising storing, at the wireless device, the cell quality that was layer 3 processed.

7. The method of claim 1, further comprising, performing layer 1 filtering on the beam measurements of the first number of beams before performing layer 3 filtering on the beam measurements of the first number of beams.

8. A wireless device configured to communicate with a network node, wherein the wireless device is further configured to:
   detect a first number of beams associated with a first cell;
   process a subset of the first number of beams, the processing providing a cell quality associated with the first cell;
   perform layer 3 filtering on the cell quality;
   perform layer 3 filtering on beam measurements of the first number of beams;

generate a measurement report, the measurement report comprising the cell quality that was layer 3 filtered, the beam measurements that were layer 3 filtered, and one or more identifiers; and transmit the measurement report to a network node.

9. The wireless device of claim 8, wherein the wireless device is further configured to detect a second number of beams, the second number of beams greater than the first number.

10. The wireless device of claim 8, wherein the wireless devices is further configured to:

detect a triggering event; and transmit to the network node, the measurement report after the triggering event is detected.

11. The wireless device of claim 8, wherein the wireless device is further configured to receive a handover command, the handover command generated based on the measurement report.

12. The wireless device of claim 8 wherein the measurement report comprises:

one or more beam identifiers per cell, or one or more beam identifiers per cell and associated beam measurements.

13. The wireless device of claim 8, wherein the wireless device is further configured to store the cell quality that was layer 3 processed.

14. The wireless device of claim 8, wherein the wireless device is further configured to perform layer 1 filtering on the beam measurements of the first number of beams before performing layer 3 filtering on the beam measurements of the first number of beams.

* * * * *